Sept. 21, 1937.  J. F. PAULSEN ET AL  2,093,846
ELASTIC SUSPENSION OF ENGINES
Filed Dec. 24, 1935  3 Sheets-Sheet 1

Inventors:
J. F. Paulsen
N. Strachovsky
By: Glascock Downing & Seebold
Attys.

Sept. 21, 1937. J. F. PAULSEN ET AL 2,093,846
ELASTIC SUSPENSION OF ENGINES
Filed Dec. 24, 1935 3 Sheets-Sheet 2
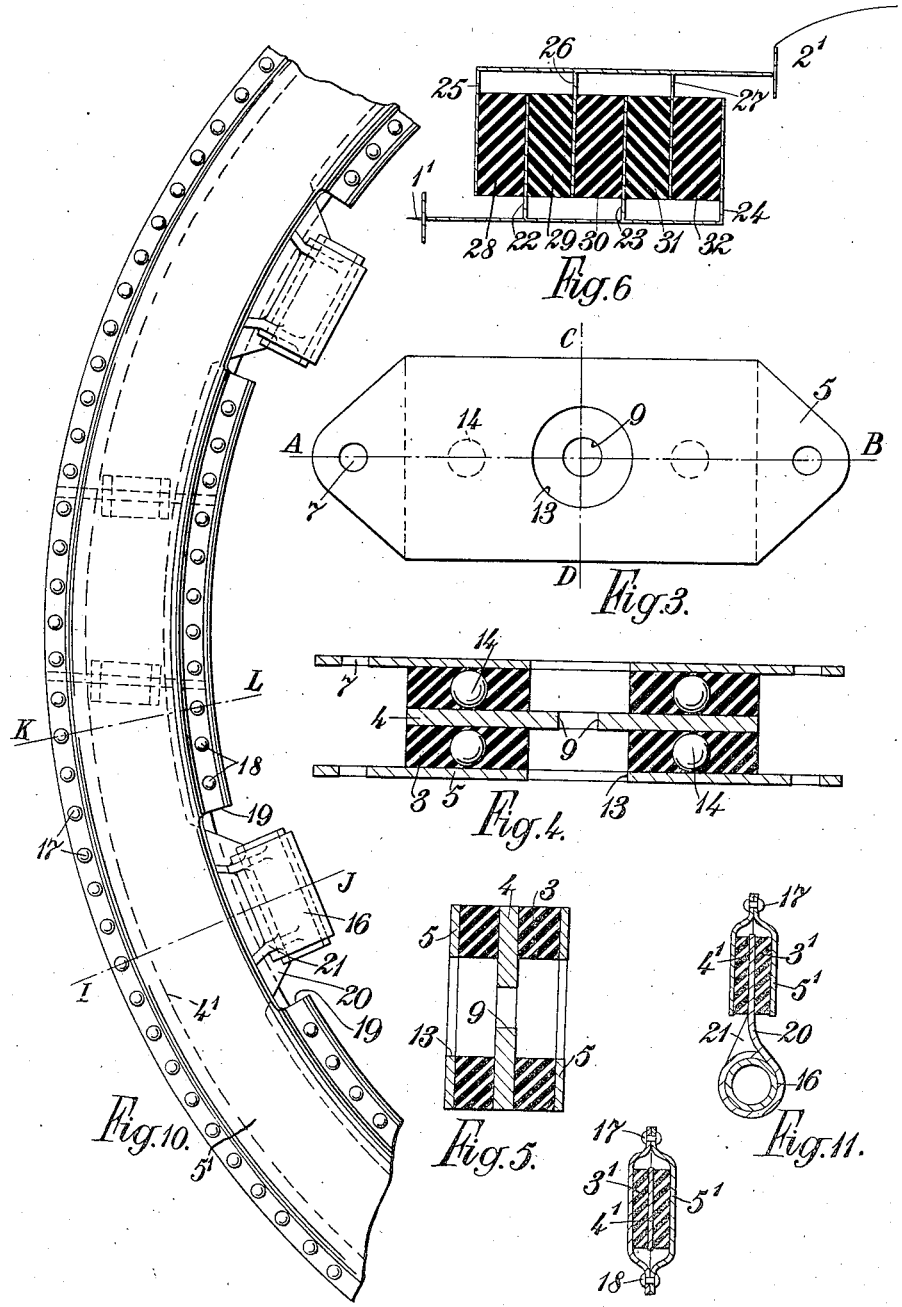

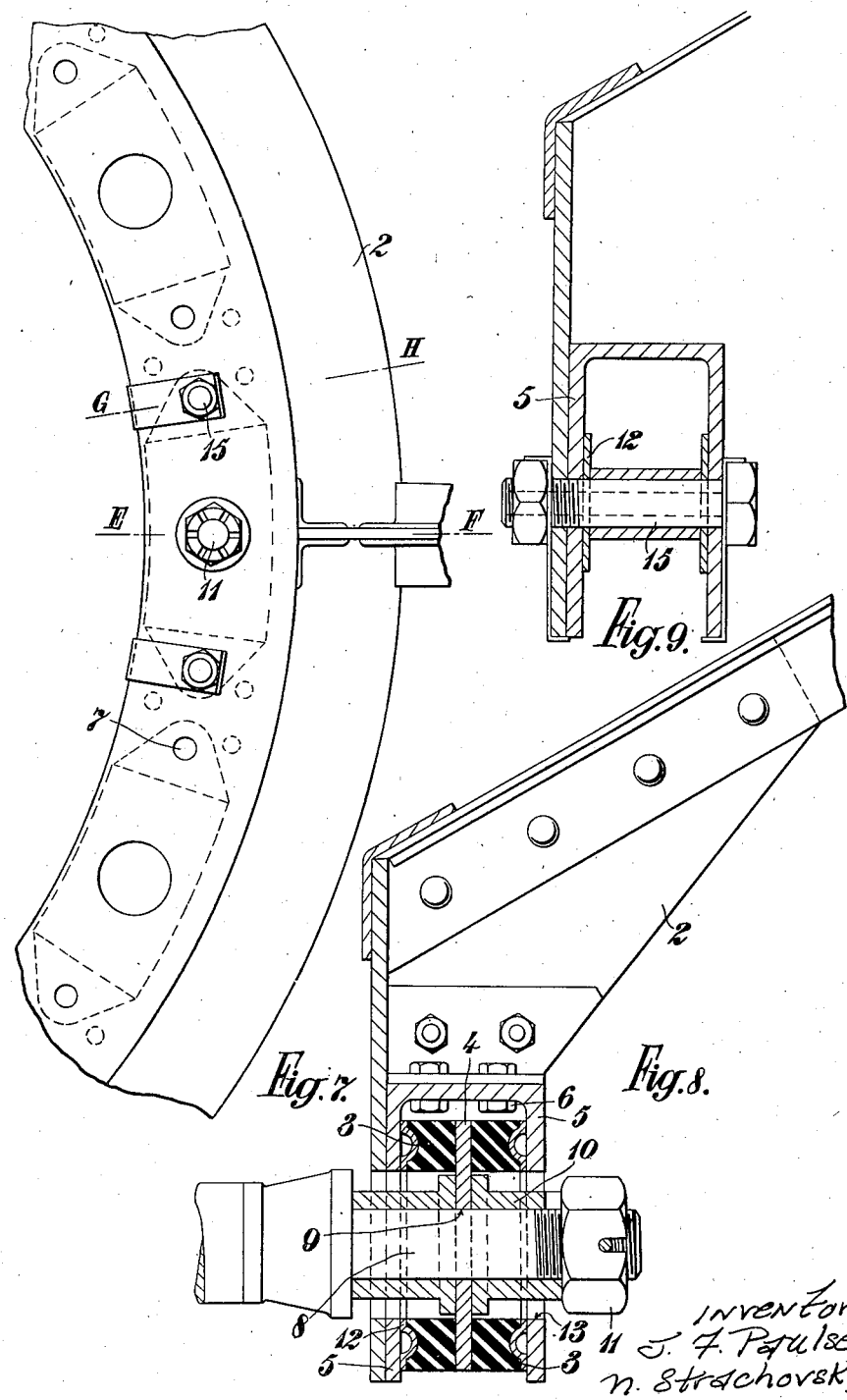

Patented Sept. 21, 1937

2,093,846

UNITED STATES PATENT OFFICE 2,093,846

ELASTIC SUSPENSION OF ENGINES

Jean Felix Paulsen, Viroflay, and Nikita Strachovsky, Paris, France

Application December 24, 1935, Serial No. 56,125
In Great Britain December 1, 1934

3 Claims. (Cl. 248—5)

It is known that the operation of all internal combustion engines is accompanied by vibrations due:—

1. To the pulsatory nature of the engine torque;

2. The appearance with the rotation of the engine of internal inertia stresses.

I.—The pulsatory form of the engine torque arises from the succession at uniform intervals of the cycles of evolution and of combustion of the gaseous mixture in the cylinders, the number of which, however high it may be (18 to 24), is nevertheless insufficient to transmit a practically uniform resultant force to the crank shaft.

The reaction opposed by the masses of the engine to this pulsating torque is an equal and opposed torque which tends to produce both the rotation of the engine in the opposite direction to that of the crank shaft and polar vibrations of this block about an axis parallel to the axis of the crank shaft and passing through the centre of gravity of the said block and the preponderant frequency of which is equal to that of the explosions in the cylinders.

II.—The internal inertia stresses arise from the movements of the various movable parts of the engine such as cranks, connecting rods, etc. These are forces and torques due—

(a) Some to unavoidable imperfections in the balancing of the rotating or reciprocating moving masses, the frequency of vibration being that of the rotation of the engine, (b) Others to the theoretical impossibility of balancing completely the reciprocating moving masses the frequency of vibration of which is in general a multiple of that of the vibration of the engine.

The resultant of the inertia forces thus developed is contained in a plane perpendicular to the axis of the crank shaft at its centre and tends to produce transverse vibrations of the engine at frequencies equal or a multiple of those of the rotation of the crank shaft.

In internal combustion engines in which the cylinders are arranged radially and the centre of gravity of which is in general fairly close to the axis of the crank shaft and the plane of the cylinders a definite tendency is observed for radial vibrations to occur in all directions perpendicular to this axis.

It is also known that the fatigue of all solid bodies is much more rapid when these bodies are subjected to intermittent tensile stresses such as those resulting from vibrations than if the load was strictly constant.

Consequently the vibrations transmitted by the engine to the structure of the aeroplane contribute to the destruction of this structure. It follows that if the vibrations of the engine are prevented from being transmitted to the structure of the aeroplane the life of this structure will be lengthened or its mechanical strength will be maintained for a longer period which is the equivalent of increasing the factor of safety.

Another aspect of the production of vibrations upon a structure such as that of an aeroplane resides in the fact that resonance phenomena may be produced in the large flat surfaces of which this structure is formed, thus magnifying the noises produced by the engine, and in certain cases dangerous parasitic resonances may even be produced such as resonances of the ailerons, the rudders and the wings which by their nature may compromise the safety of the aeroplane in flight.

As the conditions of safety on the one hand and of absence of noise on the other hand are questions of great importance in aeroplanes, it is very desirable to improve these conditions of safety and absence of noise, and as they depend directly upon vibrations transmitted by the engine, it is desirable to prevent or avoid completely the transmission of these vibrations.

Now it is known that if it is desired to avoid transmitting a vibration or a series of vibrations between two parts which have to be connected to one another, it is necessary for these two parts to be capable of elastic movement relative to one another and the elasticity of this displacement must be proportioned to the frequency of the vibrations and to the masses of the parts considered.

Consequently if it is desired to prevent the vibrations of an engine from being transmitted to the structure of an aeroplane, the connection between the engine and the structure of the aeroplane must be of such a nature as to permit a relative displacement between this engine and the said structure of the aeroplane, the elastic limits of this displacement being proportioned to the frequencies of the vibratory stresses and to the masses considered.

The object of the present invention is to provide an engine suspension and particularly a suspension for an aeroplane engine which prevents the vibrations due to the motion of the engine from being transmitted to the engine support, for example to the structure of an aeroplane by the provision of elastic mounts placed between the engine and its support.

For this purpose according to the invention the engine and its support are connected by means of elastic mounts distributed around the axis of the crank shaft at a certain distance from this axis and in a plane substantially perpendicular to the axis of the crank shaft. These elastic mountings are advantageously arranged at equal distances from an axis parallel to the axis of the crank shaft and passing through the centre of gravity of the complete engine group.

Further, these elastic mounts are preferably formed and arranged in such a way as to have a great angular elasticity relative to the axis of the crank shaft, a great transverse elasticity in all radial directions or directions substantially perpendicular to this axis of the crank shaft, and a relatively very small elasticity in a direction parallel to the axis of the crank shaft.

Further features and advantages of the invention will appear from the following description.

Various embodiments of the subject matter of the invention are illustrated by way of example in the accompanying drawings.

Figure 3 represents an elevation of an elastic mounting for the suspension of the engine.

Figures 4 and 5 are sectional views of this mounting taken respectively on the lines A—B and C—D in Figure 3.

Figure 6 represents diagrammatically the use of a plurality of sets of elastic mounts arranged between the engine and its support.

Figure 7 represents in partial elevation an embodiment of the suspension device according to the invention.

Figures 8 and 9 are sections taken on the lines E—F and G—H in Figure 7.

Figure 10 represents in partial elevation another embodiment of the suspension device.

Figures 11 and 12 are sections taken respectively on the lines I—J and K—L in Figure 10.

Figure 1:
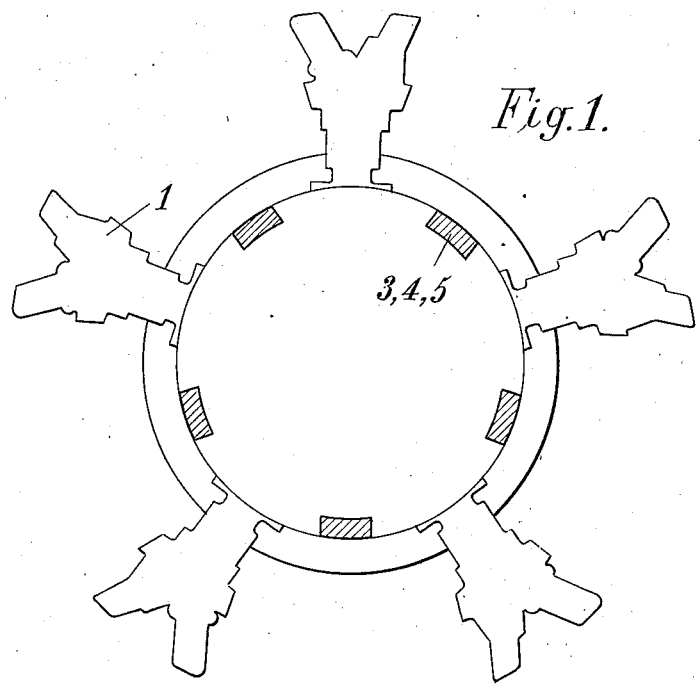
Figures 1 and 2 are respectively a diagrammatic front elevation and side elevation of an engine of the radial type mounted upon its support.
Figure 2:
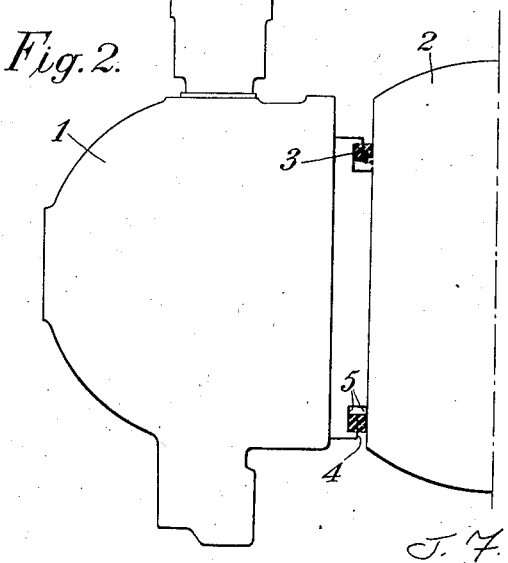

In Figures 1 and 2 the engine 1 of the radial type is fixed upon a support 2 by means of elastic mounts formed by side plates 4 rigid with the engine 1, plates 5 rigid with the support 2 and packing elements 3 made of an elastic material such as rubber, for example, inserted between the plates 4 and 5. These elastic mounts 3, 4 and 5 are arranged radially in a plane perpendicular to the axis of the crank shaft. Preferably they are arranged at equal distances from an axis perpendicular to the axis of the crank shaft and passing through the centre of gravity of the complete engine group, that is to say, the engine with its propeller. It is also preferable to distribute these mounts uniformly so that they are situated at equal distances from one another.

Any number of elastic mounts may be provided. In the example illustrated in Figure 1 they are five in number, that is to say, equal in number to the number of cylinders of the engine. The number of mounts may also be a multiple or a fraction (sub-multiple) of the number of cylinders. Each elastic packing element 3 is connected in a permanent manner to a plate 4 and a plate 5, and this connection must be so much stronger than the material of the elastic packing itself that it will be impossible to separate the plates 4 and 5 from one another without breaking or destroying the interposed elastic material.

The parts 4 and 5 rigid with the engine 1 and with the support 2 and the elastic material 3 interposed between these parts are formed and arranged in such a manner that the whole suspension device has a great angular elasticity relative to the axis of the crank shaft, a great transverse elasticity in all radial directions or directions substantially perpendicular to this axis of the crank shaft, and a relatively small elasticity in a direction parallel to the axis of the crank shaft. For this purpose the parts 4 and 5 rigid with the engine 1 and with the support 2 are limited by flat faces substantially perpendicular to the axis of the crank shaft, the packing 3 of elastic material being united in a permanent manner with these flat faces. This packing of elastic material will thus have a substantially uniform thickness and it will be arranged so as to work by elastic deformation under transverse or tangential shearing stresses for all relative angular or radial displacements between the parts 4 and 5 with respect to the axis of the crank shaft, or by deforming elastically under compressive tensile stresses for all relative displacements between the parts 4 and 5 parallel to the axis of the crank shaft.

Figures 7, 8 and 9 show an embodiment in which the rubber packing elements 3 adhere strongly to plates 4 and to stamped plates 12. The plates 4 are secured to the engine by rods 8 rigidly attached to the engine and passing through a hole 9 in the plates 4 and by the sleeves 10 and the nut 11.

The stamped plates 12 are secured to the plates 5 by bolts 15 passing through holes 7. The plates 5 are rigidly secured to the framework 2 of an aeroplane for example by means of bolts 6. Each rod 8 passes through the holes 13 of plates 5 with sufficient clearance to permit all the admissible relative angular and transverse displacements between the plates 4 and 5.

If these relative displacements tend to exceed this permissible clearance the sleeve 10 will abut against the walls of the holes 13 so as to limit the relative displacements between the plates 4 and 5.

It will also be noted that if the rubber packing 3 breaks or deteriorates, the plates 4 held on the rod 8 cannot come out through the holes 13 so that the engine will remain attached to its support in approximately the same position it occupied before the fracture of the rubber.

Figures 3, 4 and 5 show the main parts of one of the elastic mounts 3, 4, 5. It will be noted that these mounts are formed of substantially rectangular or segmental-shaped parts, which are distributed uniformly around the axis of the crank shaft or around an axis parallel to the crank shaft and passing through the centre of gravity of the engine group.

Inelastic balls 14 made of steel for example may be inserted in the joints in the packing elements 3, in order to limit the relative axial displacements between the plates 4 and 5. It will be noted that if these balls have a diameter equal to the distance between the plates 4 and 5, these plates will no longer be able to approach each other so that in this case the elastic mounts will permit relative displacements between the engine and its support in all directions except the direction parallel to the axis of the crank shaft. Instead of limiting this relative axial displacement by means of balls the same result may be obtained by laminating the packings 3 and by interposing between two successive layers of rubber metallic sheets which are caused to adhere strongly to the two thicknesses of rubber situated on either side of these plates.

In the embodiment shown in Figures 10, 11 and 12 the engine and its support are connected together by means of an elastic mounting forming a complete ring. Circular rubber crowns 3' are inserted between the circular plates 5' rigid with the engine support, for example the structure of an aeroplane, and a circular ring 4' secured to the engine by sleeves 16 integral with the ring 4' and by bolts (not shown) passing through the sleeves 16 and straps or yokes (not shown) secured to the engine.

The two circular plates 5' are connected at their outer periphery by bolts 17 and at their inner periphery by bolts 18 so as to form a box of toric shape. Recesses 19 are provided in the plates 5' for the passage of lugs 20 and ribs 21 connecting the sleeves 16 to the ring 4'.

The clearance in these recesses is sufficient to permit all admissible relative angular displacements between the ring 4' and the plates 5'.

In the event of excessive angular displacement, the lugs 20 abut against the edges of the recesses 19 and limit this angular displacement.

The transverse relative displacements are limited by the abutment of the ring 4' against the outer periphery or against the inner periphery of the box formed by the plates 5'. Finally in the event of the fracture or deterioration of the rubber crowns 3' the ring 4' will remain lodged in the box formed by the plates 5' so that the engine will remain attached to its support in a position which is approximately the same as that which it occupied before the fracture of the rubber.

In the foregoing examples each elastic mount comprises two rubber packing elements 3, disposed between a central plate 4 rigid with the engine and two lateral plates 5 rigid with the support.

It will also be possible to employ in each mount only one single packing element 3 between a plate 4 and a plate 5.

A plurality of plates 22, 23, 24 may also be fixed upon the engine 1' as shown diagrammatically in Figure 6 and a plurality of plates 25, 26, 27 upon the support 2', these plates being arranged behind one another and the plates rigid with the engine alternating with those rigid with the support. Between these plates are interposed rubber packing elements 28, 29, 30, 31, 32 adhering strongly and in a permanent manner to the said plates. The packing elements 28, 30, 32 for example may have a different hardness or consistency from that of the packing elements 29 and 31. In this way the resistance opposed by the elastic mounts against deformations occurring in a direction parallel to the axis of the crank shaft will differ according as the force producing the deformation acts by compression or by tension, or according as this force is exerted in one direction or in the opposite direction in the line of the crank shaft axis.

It is obvious that the invention is not limited to the embodiments described above and that numerous modifications may be made without thereby going outside the scope of the invention.

We claim:

1. An elastic mounting means for an engine having a plurality of cylinders spaced around a crankshaft, said elastic mounting means being arranged about the axis of said crankshaft, each elastic mounting means comprising an engine support, outer plate members, an inner plate member, and elastic material adhering to said inner and outer plate members, said outer plate members having central openings and being rigidly connected at their ends to said engine support, a connection passing through said central opening and rigidly attaching the inner plate member to said engine, a clearance being provided between said connection and said central openings.

2. An elastic mounting means for an engine having a plurality of cylinders spaced around a crankshaft, said elastic mounting means being arranged about the axis of said crankshaft, each elastic mounting means comprising outer plate members, attachment means at opposite ends of said outer plate members forming a rigid connection with an engine support, an inner plate member and elastic material bonding said outer and inner plate members, attachment means forming a rigid connection to the engine and including a member extending through said outer plate members to said inner plate member, said outer plate members forming an abutment limiting the relative movement between said inner and outer plate members in all directions perpendicular to the axis of the crankshaft.

3. A resilient mounting means for an aircraft engine having a plurality of cylinders spaced around a crankshaft, said mounting means being arranged substantially in the plane of rotation about an axis parallel to the crankshaft and passing through the centre of gravity of the engine, said resilient mounting means comprising an engine support, substantially flat members rigid with the engine support, a substantially flat member rigid with the engine, said flat members facing in a direction parallel with the crankshaft axis, resilient means connecting said flat members and permitting relatively large movements of said members in directions parallel to each other, and separate spacing elements embedded in said resilient means and located between and restricting the relative movement of said members in a direction parallel to the crankshaft, said latter means being inelastic and having a thickness substantially equal to the resilient means.

JEAN FELIX PAULSEN.
NIKITA STRACHOVSKY.